United States Patent
Yamaguchi

(10) Patent No.: US 9,712,656 B2
(45) Date of Patent: Jul. 18, 2017

(54) CONTROL DEVICE, COMMUNICATION APPARATUS, CONTROL SYSTEM, CONTROL METHOD AND STORAGE MEDIUM

(75) Inventor: Tomoharu Yamaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 1198 days.

(21) Appl. No.: 12/669,173

(22) PCT Filed: Jul. 16, 2008

(86) PCT No.: PCT/JP2008/062867
§ 371 (c)(1),
(2), (4) Date: Jan. 14, 2010

(87) PCT Pub. No.: WO2009/014049
PCT Pub. Date: Jan. 29, 2009

(65) Prior Publication Data
US 2010/0228966 A1    Sep. 9, 2010

(30) Foreign Application Priority Data
Jul. 20, 2007  (JP) ................... 2007-189338

(51) Int. Cl.
*H04M 1/67* (2006.01)
*H04M 1/725* (2006.01)

(52) U.S. Cl.
CPC ........... *H04M 1/67* (2013.01); *H04M 1/7253* (2013.01); *H04M 1/72577* (2013.01)

(58) Field of Classification Search
CPC ... H04M 1/67; H04M 1/7253; H04M 1/72577
(Continued)

(56) References Cited

U.S. PATENT DOCUMENTS 6,457,129 B2 * 9/2002 O'Mahony ................. 726/4
6,633,911 B1 * 10/2003 Matsuzaki ........ H04L 29/06027
709/206

(Continued)

FOREIGN PATENT DOCUMENTS

JP    2931276 B    5/1999
JP    2937820 B    6/1999
(Continued)

OTHER PUBLICATIONS

International Search Report for PCT/JP2008/062867 mailed Oct. 28, 2008.
(Continued)

*Primary Examiner* — Michael Pyzocha

(57) ABSTRACT

A control system which can control a function of a device depending on the result of authentication of an external device that exists outside the device and prevent others from using the device without permission is provided. The control system includes a control device (100) which controls at least one function (1), and at least one external device (900-1 to n: n is an arbitrary integer) which exists outside the control device (100). The control device (100) authenticates the external devices (900-1 to n), and controls the function (1) depending on the number of authenticated devices which can be authenticated and the number of unauthenticated devices which can not be authenticated.

15 Claims, 7 Drawing Sheets

(58) Field of Classification Search
USPC ....... 713/155, 159, 164, 165, 166, 167, 168, 713/171, 172, 182, 184, 185; 726/17, 19, 726/20, 26, 27, 29, 30; 455/410, 411
See application file for complete search history.

(56) References Cited

U.S. PATENT DOCUMENTS

| | | | | |
|---|---|---|---|---|
| 7,061,376 | B2* | 6/2006 | Wang | G07C 9/00111 340/5.2 |
| 7,437,765 | B2* | 10/2008 | Elms | G06F 21/83 345/615 |
| 8,205,093 | B2* | 6/2012 | Argott | G06F 21/6209 370/352 |
| 9,129,088 | B1* | 9/2015 | Baschy | G06F 21/10 |
| 2002/0093425 | A1* | 7/2002 | Puchek | G06K 9/00973 340/540 |
| 2004/0014423 | A1* | 1/2004 | Croome et al. | 455/41.2 |
| 2004/0153656 | A1 | 8/2004 | Cluts et al. | |
| 2004/0153671 | A1* | 8/2004 | Schuyler | G07C 9/00111 726/9 |
| 2004/0188185 | A1* | 9/2004 | Pieper | B66B 1/468 187/391 |
| 2005/0125674 | A1* | 6/2005 | Nishiki | G07C 9/00031 713/182 |
| 2005/0278776 | A1* | 12/2005 | Kitagawa et al. | 726/3 |
| 2006/0021005 | A1* | 1/2006 | Williams et al. | 726/2 |
| 2006/0022042 | A1 | 2/2006 | Smets | |
| 2006/0128305 | A1* | 6/2006 | Delalat | 455/41.2 |
| 2007/0028119 | A1* | 2/2007 | Mirho | G07C 9/00087 713/189 |
| 2007/0050362 | A1* | 3/2007 | Low | G06F 21/6245 |
| 2007/0083915 | A1* | 4/2007 | Janakiraman | G06F 21/316 726/4 |
| 2007/0140494 | A1* | 6/2007 | Kumoluyi | H04L 63/105 380/270 |
| 2007/0157322 | A1* | 7/2007 | Onno | G07C 9/00007 726/28 |
| 2007/0273514 | A1* | 11/2007 | Winand | B64F 1/366 340/572.1 |
| 2008/0289030 | A1* | 11/2008 | Poplett | 726/15 |
| 2008/0320565 | A1* | 12/2008 | Buch | H04L 12/581 726/4 |

FOREIGN PATENT DOCUMENTS

| | | |
|---|---|---|
| JP | 2001237950 A | 8/2001 |
| JP | 2001358827 A | 12/2001 |
| JP | 2002135407 A | 5/2002 |
| JP | 200315553 A | 5/2003 |
| JP | 2003208409 A | 7/2003 |
| JP | 2004234665 A | 8/2004 |
| JP | 2005352710 A | 12/2005 |
| JP | 2007135153 A | 5/2007 |
| WO | 2005029890 A1 | 3/2005 |
| WO | WO-2006/103387 A1 * | 10/2006 ............ H04Q 7/38 |

OTHER PUBLICATIONS

Supplementary European Search Report for EP 08 77 8210 completed Nov. 30, 2011.
Japanese Office Action for JP2007-189338 mailed on Jan. 15, 2012.

* cited by examiner

| CONDITION | CONTROL MATTER |
|---|---|
| CONDITION 1<br>NUMBER OF AUTHENTICATED DEVICES = 0,<br>NUMBER OF UNAUTHENTICATED DEVICES = 0 | EFFECTIVE (VOICE COMMUNICATION)<br>RESTRICTED (PHONEBOOK, USER INTERFACE) |
| CONDITION 2<br>NUMBER OF AUTHENTICATED DEVICES > 0,<br>NUMBER OF UNAUTHENTICATED DEVICES = 0 | EFFECTIVE (VOICE COMMUNICATION, PHONEBOOK, USER INTERFACE)<br>RESTRICTED (*) |
| CONDITION 3<br>(NUMBER OF AUTHENTICATED DEVICES)<br>≧ (NUMBER OF UNAUTHENTICATED DEVICES ≠ 0) | EFFECTIVE (VOICE COMMUNICATION, USER INTERFACE)<br>RESTRICTED (PHONEBOOK) |
| CONDITION 4<br>(NUMBER OF AUTHENTICATED DEVICES ≠ 0)<br>< (NUMBER OF UNAUTHENTICATED DEVICES) | EFFECTIVE (VOICE COMMUNICATION)<br>RESTRICTED (PHONEBOOK, USER INTERFACE) |
| CONDITION 5<br>(NUMBER OF AUTHENTICATED DEVICES = 0)<br>< (NUMBER OF UNAUTHENTICATED DEVICES) | EFFECTIVE (*)<br>RESTRICTED (VOICE COMMUNICATION, PHONEBOOK, USER INTERFACE) |
| ... | ... |

CONTROL DEVICE, COMMUNICATION APPARATUS, CONTROL SYSTEM, CONTROL METHOD AND STORAGE MEDIUM

TECHNICAL FIELD

The present invention relates to a control device, a communication apparatus, a control system, a control method and a storage medium storing a control program, and particularly to a control device, a communication apparatus, a control system, a control method and a storage medium storing a control program, which can control various functions depending on the number of external devices existing outside the device.

BACKGROUND ART

Recently, communication apparatuses such as mobile phones are remarkably spread, and the communication apparatuses mounted with various functions are used in various regions.

Note that the recent communication apparatus is smaller and lighter, and its operability is good, thereby being extremely convenient. One can communicate with the communication apparatus without any inhibition at any place within a communication range.

However, with the increase in number of communication apparatus, a trouble such that the communication apparatus is passed on to anyone other than the owner increases due to the communication apparatus being misplaced, stolen and the like. Also, a situation occurs where anyone other than the owner uses the communication apparatus without permission.

Given this situation, as one of documents filed prior to the present invention, there is a document disclosing a technology which can make a device itself such as a mobile phone unavailable and warn that the device is away beyond a certain distance, when the device is away from the owner or user due to the device being misplaced or stolen (for example, see Patent Document 1).

In the above-mentioned Patent Document 1, an identification signal transmitting unit and a usage restriction canceling unit are attached to the target device. When a distance between the above-mentioned units is below a certain distance, the usage restriction canceling unit transmits a usage restriction canceling signal to the target device. When the distance between the above-mentioned units becomes beyond the certain distance, and a reception level of a code signal received in each unit from the opposite unit becomes less than or equal to a predetermined value, the above-mentioned usage restriction canceling unit stops the transmission of the usage restriction canceling signal. Then, the identification signal transmitting unit sends out a warning signal. Therefore, it is possible to make the target device itself unavailable and to warn that the target device is away beyond the certain distance, when the target device is away from the owner or user.

Further, there is a document disclosing a technology which facilitates dial lock and unlock in a mobile phone, and prevents others from using the mobile phone when it is lost with unlocked (for example, see Patent Document 2).

In the above-mentioned Patent Document 2, an unlock code transmitting unit built into an unlock device transmits a radio wave on which an unlock code is superimposed. An unlock code receiving unit in the mobile phone receives this unlock code to be compared with a code preliminarily recorded in a control unit. When the codes are coincident, the unlock code receiving unit unlocks the dial lock. In this condition, when the code is not received for a certain period of time (when the unlock device is away), the unlock code receiving unit relocks the dial lock. Therefore, it is possible to facilitate the dial lock and unlock in the mobile phone, and to prevent others from using the mobile phone when it is lost with unlocked.

Further, there is a document disclosing a portable information device which makes it unnecessary to prepare and carry a particular device for the prevention of the loss (for example, see Patent Document 3).

In the above-mentioned Patent Document 3, the portable information device, into which a near field communication function between devices is built, uses its function to recognize a communication error which occurs when any one of the devices is away from another one of the devices beyond a certain distance, and broadcasts the recognition. Therefore, it is unnecessary to prepare and carry the particular device for the prevention of the loss.

Further, there is a document disclosing a technology which can prevent others from using a mobile terminal without permission, and improve the security (for example, see Patent Document 4).

In the above-mentioned Patent Document 4, a restriction condition such as times and places where the mobile terminal can be used is added to authentication information transmitted from an authentication card of the user to the mobile terminal. Therefore, it is possible to perform detailed authentication depending on the situation, prevent others from using the mobile terminal without loosing the convenience, and improve the security.

Furthermore, there is a document disclosing a technology which can not only provide more flexibility on the authenticating side but also respond to a broadband service by using one physical terminal (user terminal) held by a user, and authenticate various services (for example, see Patent Document 5).

In the above-mentioned Patent Document 5, a user authenticating device registers user authentication information for authenticating the user terminal. Then, the user authenticating device accepts an input of user authentication information from the user terminal, and authenticates the user terminal by using the accepted user authentication information and the registered user authentication information. Therefore, it is possible to provide more flexibility on the authenticating side by using the user terminal held by the user, and authenticate various services.

[Patent Document 1]
Japanese Patent No. 2931276
[Patent Document 2]
Japanese Patent No. 2937820
[Patent Document 3]
Japanese Unexamined Patent Application Publication No. 2001-237950
[Patent Document 4]
Japanese Unexamined Patent Application Publication No. 2001-358827
[Patent Document 5]
Japanese Unexamined Patent Application Publication No. 2003-208409

DISCLOSURE OF INVENTION

Technical Problem

Note that in order to prevent others from using a device without permission, it is general to input a password, a personal identification number and the like to the device, and authenticate a user (lock function).

However, when a device is exclusively used by a particular individual user like a communication apparatus such as a mobile phone, it bothers the user to input the password or the like every time the device is used. Therefore, the lock function is not utilized, so that it becomes difficult to ensure the security of the device upon being misplaced or stolen.

Note that in the above-mentioned Patent Documents 1 to 5, various functions for preventing others from using the device without permission are disclosed. However, there is no disclosure to authenticate external devices which exist outside the device, and control a function of the device depending on the number of devices which can be authenticated and the number of devices which can not be authenticated. Its necessity is not also suggested.

The present invention has been made in view of the above-mentioned circumstances, and an object of the present invention is to provide a control device, a communication apparatus, a control system, a control method and a storage medium storing a control program capable of controlling a function of a device depending on the result of authentication of an external device which exists outside the device, and of preventing others from using the device without permission.

Technical Solution

In order to achieve the object, the present invention includes the following features.

<Control Device>

A control device according to the present invention is the one that controls at least one function. This control device includes an authentication means for authenticating external devices that exist outside the control device, and a function controlling means for controlling the function depending on the number of authenticated devices able to be authenticated by the authentication means and the number of unauthenticated devices not able to be authenticated by the authentication means.

<Communication Apparatus>

Further, a communication apparatus according to the present invention is the one mounted with the above-mentioned control device. The control device controls a function of the communication apparatus.

<Control System>

Further, a control system according to the present invention includes a control device that controls at least one function, and at least one external device that exists outside the control device. The control device includes an authentication means for authenticating the external device, and a function controlling means for controlling the function depending on the number of authenticated devices able to be authenticated by the authentication means and the number of unauthenticated devices not able to be authenticated by the authentication means.

<Control Method>

Further, a control method according to the present invention is the one performed in a control device that controls at least one function. This control method includes an authentication step of authenticating external devices that exist outside the control device, and a function controlling step of controlling the function depending on the number of authenticated devices able to be authenticated at the authentication step and the number of unauthenticated devices not able to be authenticated at the authentication step.

<Storage Medium Storing Control Program>

Furthermore, a storage medium according to the present invention stores a control program. This control program causes a control device that controls at least one function to execute an authentication process for authenticating external devices that exist outside the control device, and a function controlling process for controlling the function depending on the number of authenticated devices able to be authenticated in the authentication process and the number of unauthenticated devices not able to be authenticated in the authentication process.

ADVANTAGEOUS EFFECTS

According to the present invention, it is possible to control a function of a device depending on the result of authentication of an external device which exists outside the device, and prevent others from using the device without permission.

BEST MODE FOR CARRYING OUT THE INVENTION

<Outline of Control System>

Firstly, an outline of a control system according to a first embodiment is explained with reference to FIG. 1.

The control system according to the first embodiment includes a control device (100) which controls at least one function (1), and at least one external device (900-1 to n: n is an arbitrary integer) which exists outside the control device (100).

Further, the control device (100) authenticates the external devices (900-1 to n), and controls the function (1) depending on the number of authenticated devices which can be authenticated and the number of unauthenticated devices which can not be authenticated.

Therefore, it is possible to control at least one function (1) depending on the result of authentication of the external devices (900-1 to n) which exist outside the control device (100). As a result, it is possible to prevent others from using the control device (100) without permission. Hereinafter, the control system according to the embodiments will be explained in detail with reference to the accompanying drawings.

(First Embodiment)

<Configuration of Control System>

Firstly, a configuration of the control system according to this embodiment is explained with reference to FIG. 1.

The control system according to this embodiment includes the control device (100) and the external devices (900-1 to n: n is an arbitrary integer).

The control device (100) controls at least one function (1). Further, the external devices (900-1 to n) communicate with the control device (100). The external devices (900-1 to n) may include a wireless tag, an IC card, an access point, a server and the like.

Note that in the control system according to this embodiment, a relation of connection between the control device (100) and the external devices (900-1 to n) is not particularly limited, and every connection topology can be applied regardless of wireless or wired connection.

<Internal Configuration of Control Device 100>

Next, an internal configuration of the control device (100) according to this embodiment is explained with reference to FIG. 1.

As shown in FIG. 1, the control device (100) according to this embodiment includes an authentication unit (110), an authenticated device counting unit (120), an unauthenticated device counting unit (130), a function controlling unit (140) and a control condition retaining unit (150).

The authentication unit (110) authenticates the external devices (900-1 to n). The authentication unit (110) receives identification information and information for authentication of the external device (900-1 to n), and authenticates the external device (900-1 to n) based on the received identification information and information for authentication.

Note that the identification information is the one for specifying the external device (900-1 to n). The authentication unit (110) specifies the external device (900-1 to n) based on the identification information received from the external device (900-1 to n). Note that as the identification information, every information can be applied if it is possible to specify the external device (900-1 to n).

Further, the information for authentication is the one for verifying the validity of the external device (900-1 to n). The authentication unit (110) compares information for authentication retained by the authentication unit (110) itself with the information for authentication received from the external device (900-1 to n). Depending on the comparison result, the authentication unit (110) specifies the external device (900-1 to n) as the authenticated device or the unauthenticated device.

For example, when both of the information for authentication retained by the authentication unit (110) and the information for authentication received from the external device (900-1 to n) are coincident, the authentication unit (110) determines that it can authenticate the external device (900-1 to n). Then, the authentication unit (110) specifies the external device (900-1 to n) as the authenticated device, and notifies the authenticated device counting unit (120) of the result.

Further, when both information for authentication are not coincident, the authentication unit (110) determines that it can not authenticate the external device (900-1 to n). Then, the authentication unit (110) specifies the external device (900-1 to n) as the unauthenticated device, and notifies the unauthenticated device counting unit (130) of the result. Note that as the information for authentication, every information can be applied if it is possible to verify the validity of the external device (900-1 to n).

The authenticated device counting unit (120) counts and retains the number of external devices (authenticated devices) which can be authenticated by the authentication unit (110).

The unauthenticated device counting unit (130) counts and retains the number of external devices (unauthenticated devices) which can not be authenticated by the authentication unit (110).

As shown in FIG. 2, the control condition retaining unit (150) retains "condition" made up of the number of the authenticated devices and the number of the unauthenticated devices in association with "control matter" for controlling various functions (1) depending on the "condition".

As shown in FIG. 2, the "control matter" may include a function which is controlled so as to be "effective" in the control device (100), a function which is "restricted" in the control device (100) and the like.

The function controlling unit (140) controls the various functions (1) depending on the number of the authenticated devices which can be authenticated by the authentication unit (110), and the number of the unauthenticated devices which can not be authenticated by the authentication unit (110).

Specifically, the function controlling unit (140) refers to the control condition retaining unit (150) shown in FIG. 2 based on the number of the authenticated devices retained by the authenticated device counting unit (120) and the number of the unauthenticated devices retained by the unauthenticated device counting unit (130), and specifies control matter which meets a condition depending on the number of the authenticated devices and the number of the unauthenticated devices. Then, the function controlling unit (140) outputs a control signal which indicates the specified control matter, thereby controlling the various functions (1).

<Control Operation in Control Device 100>

Next, a control operation in the control device (100) according to this embodiment is explained with reference to FIGS. 1 and 2.

Firstly, when the identification information and the information for authentication are received from the external device (900-1 to n), the authentication unit (110) authenticates the external device (900-1 to n) based on the received identification information and information for authentication, and specifies whether the external device (900-1 to n) is the authenticated device or the unauthenticated device.

When the external device (900-1 to n) can be authenticated, the authentication unit (110) specifies the external device (900-1 to n) as the authenticated device, and notifies the authenticated device counting unit (120) of the result.

Further, when the external device (900-1 to n) can not be authenticated, the authentication unit (110) specifies the external device (900-1 to n) as the unauthenticated device, and notifies the unauthenticated device counting unit (130) of the result.

Note that when the same identification information is redundantly received in a short period from the external device (900-1 to n), the authentication unit (110) does not perform the notification to the authenticated device counting unit (120) and the unauthenticated device counting unit (130).

For example, the authentication unit (110) manages the identification information received from the external device (900-1 to n) for a certain period, and manages the authenticated external device (900-1 to n) to which the authentication process is performed in the authentication unit (110) itself. When the same identification information as that managed in the authentication unit (110) is received from the external device (900-1 to n) during the certain period, the authentication unit (110) determines the external device (900-1 to n) as the authenticated external device (900-1 to n). Then, the authentication unit (110) performs no authentication of the external device (900-1 to n), and performs no notification to the authenticated device counting unit (120) and the unauthenticated device counting unit (130).

Therefore, the authentication unit (110) can perform control so as not to notify the authenticated device counting unit (120) and the unauthenticated device counting unit (130) of the result of authentication of the same external device (900-1 to n).

When the notification that the external device (900-1 to n) authenticated in the authentication unit (110) is the authenticated device is accepted from the authentication unit (110), the authenticated device counting unit (120) accumulates the number of the accepted notifications to be retained in accordance with intervals at which the authentication unit (110) performs the notification.

Further, when the notification that the external device (900-1 to n) authenticated in the authentication unit (110) is the unauthenticated device is accepted from the authentication unit (110), the unauthenticated device counting unit (130) accumulates the number of the accepted notifications to be retained in accordance with intervals at which the authentication unit (110) performs the notification.

Next, the function controlling unit (140) refers to the control condition retaining unit (150) shown in FIG. 2, based on the number of the authenticated devices retained by the authenticated device counting unit (120) and the number of the unauthenticated devices retained by the unauthenticated device counting unit (130). Then, the function controlling unit (140) specifies control matter which meets a condition depending on the number of the authenticated devices and the number of the unauthenticated devices, and outputs the control signal which indicates the specified control matter, thereby controlling the various functions (1).

For example, assume that the control condition retaining unit (150) retains control matters depending on [condition 1] to [condition 3] shown in FIG. 2.

[Condition 1]
In a case where the number of the authenticated devices is equal to or more than one and the number of the unauthenticated devices is equal to zero "number of authenticated devices>0, number of unauthenticated devices=0", all functions are effective.

[Condition 2]
In a case where the number of the authenticated devices is equal to or more than one but the number of the unauthenticated devices exceeds the number of the authenticated devices "(number of authenticated devices≠0)<(number of unauthenticated devices)", a function "A" which incurs expenses is restricted.

[Condition 3]
In a case where the number of the authenticated devices is equal to zero "number of authenticated devices=0", all functions are restricted.

Under the above-mentioned conditions, a case where the number of the authenticated devices retained by the authenticated device counting unit (120) is "2" and the number of the unauthenticated devices retained by the unauthenticated device counting unit (130) is "0" meets the [condition 1] shown in FIG. 2. In this case, the function controlling unit (140) controls all functions so as to be effective.

Further, a case where the number of the authenticated devices retained by the authenticated device counting unit (120) is "2" and the number of the unauthenticated devices retained by the unauthenticated device counting unit (130) is "3" meets the [condition 2]. In this case, the function controlling unit (140) controls a function "A" which incurs expenses so as to be restricted.

Thus, in the control device (100) according to this embodiment, the authentication unit (110) authenticates the external device (900-1 to n). Further, the authenticated device counting unit (120) counts and retains the number of the authenticated devices which can be authenticated by the authentication unit (110). Further, the unauthenticated device counting unit (130) counts and retains the number of the unauthenticated devices which can not be authenticated by the authentication unit (110).

Furthermore, the function controlling unit (140) refers to the control condition retaining unit (150) to specify control matter depending on the number of the authenticated devices retained by the authenticated device counting unit (120) and the number of the unauthenticated devices retained by the unauthenticated device counting unit (130), and controls the various functions (1) based on the specified control matter.

Therefore, the control device (100) according to this embodiment can control the various functions (1) depending on the result of authentication of the external devices (900-1 to n) which exist outside the control device (100). As a result, it is possible to prevent others from using the control device (100) without permission.

Note that the various functions may include the following functions.

Function 1: a voice communication function which performs voice communication with connecting to a subscriber network.

Function 2: a data communication function which performs data communication with connecting to the subscriber network.

Function 3: a radio communication function which performs radio communication (near field communication, proximity wireless communication).

Function 4: an access function for various information recorded in a recording means (not shown).

Function 5: an erasure function which erases the various information recorded in the recording means.

Function 6: an encryption function which encrypts the various information recorded in the recording means.

As the recording means, every means can be applied if it is possible to record the various information. For example, the recording means may include a memory such as a ROM, a RAM, a memory card and an SD card.

Further, as the various information, every information can be applied. For example, the various information may include personal information, phonebook information, schedule information and the like.

The personal information is the one concerning an owner of the control device (100). The phonebook information is the one such as a phone number and a mail address concerning a destination of the communication. The schedule information is the one concerning owner's schedule or the like.

Further, conditions for controlling the above-mentioned functions may include the following conditions.

In a case where the number of the unauthenticated devices exceeds a specific number even when the authenticated device exists, the function controlling unit (140) controls the voice communication function to stop the voice communication.

When the number of the unauthenticated devices is larger than the number of the authenticated devices, the function controlling unit (140) controls the data communication function to stop the data communication.

When the number of the unauthenticated devices is larger than the number of the authenticated devices, the function controlling unit (140) controls the radio communication function to stop the radio communication (near field communication, proximity wireless communication).

When the number of the unauthenticated devices is larger than the number of the authenticated devices, the function controlling unit (140) controls the access function to be inhibited from accessing the various information recorded in the recording means.

When the number of the unauthenticated devices is larger than the number of the authenticated devices, the function controlling unit (140) controls the erasure function to erase the various information recorded in the recording means.

When the number of the unauthenticated devices is larger than the number of the authenticated devices, the function controlling unit (140) controls the encryption function to encrypt the various information recorded in the recording means. Note that it is preferable to perform the encryption which can be decrypted by the owner of the control device (100).

Thus, the control device (100) according to this embodiment retains in the control condition retaining unit (150) control matters depending on the number of the authenticated devices and the number of the unauthenticated devices. Then, the function controlling unit (140) refers to the control condition retaining unit (150) to specify control matter depending on the number of the authenticated devices and the number of the unauthenticated devices, and controls the various functions based on the specified control matter. Therefore, the control device (100) according to this embodiment can control the various functions depending on environmental situation of the control device (100) itself.

(Mode For The Invention)

Next, a case where the above-described control device (100) is mounted on a communication apparatus (10) such as a mobile phone is explained as an example.

<Configuration of Communication Apparatus 10>

Firstly, a configuration in the case where the above-described control device (100) is mounted on the communication apparatus (10) is explained with reference to FIG. 3.

The communication apparatus (10) according to this mode includes the control device (100) shown in FIG. 1, a voice communication function (11), a phonebook function (12) and a user interface function (13).

The communication apparatus (10) according to this mode indicates a case where the voice communication function (11), the phonebook function and the user interface function (13) are applied as target functions (1) controlled by the control device (100).

Further, assume that the communication apparatus (10) performs communication by BLUETOOTH as a communication method in the authentication unit (110).

Further, assume that the external device (900-1 to n) is a headset, a personal computer and the like connectable via BLUETOOTH.

Furthermore, assume that a device number in the information conveyed via BLUETOOTH is used as the identification information received by the communication apparatus (10) from the external device (900-1 to n), and information encrypted by using a shared key is used as the information for authentication.

Therefore, the external device (900-1 to n) preliminarily retains the shared key. When the communication apparatus (10) and the external device (900-1 to n) retain the same shared key, the communication apparatus (10) determines that it can authenticate the external device (900-1 to n). Then, the communication apparatus (10) specifies the external device (900-1 to n) as the authenticated device.

Further, when the communication apparatus (10) and the external device (900-1 to n) retain mutually different shared keys, the communication apparatus (10) determines that it can not authenticate the external device (900-1 to n). Then, the communication apparatus (10) specifies the external device (900-1 to n) as the unauthenticated device.

Note that as shown in FIG. 4, the control condition retaining unit (150) according to this mode retains "condition" made up of the number of the authenticated devices and the number of the unauthenticated devices in association with "control matter" for controlling various functions depending on the "condition".

As shown in FIG. 4, the "control matter" may include a function which is controlled so as to be "effective" in the communication apparatus (10), a function which is "restricted" in the communication apparatus (10) and the like.

The function controlling unit (140) refers to the control condition retaining unit (150) shown in FIG. 4 based on the number of the authenticated devices retained by the authenticated device counting unit (120) and the number of the unauthenticated devices retained by the unauthenticated device counting unit (130), and specifies control matter which meets a condition depending on the number of the authenticated devices and the number of the unauthenticated devices. Then, the function controlling unit (140) outputs a control signal which indicates the specified control matter, thereby controlling various functions (11 to 13).

For example, a case where around the communication apparatus (10), only external devices (900-1 to n) which can be authenticated by using the shared key of the communication apparatus (10) exist but no external device (900-1 to n) which can not be authenticated by using the shared key of the communication apparatus (10) exists "number of authenticated devices>0, number of unauthenticated devices=0" meets [condition 2] shown in FIG. 4. In this case, the function controlling unit (140) controls the voice communication function (11), the phonebook function (12) and the user interface function (13) so as to be effective, thereby enabling to use all functions in the communication apparatus (10).

Further, a case where no external device (900-1 to n) which can be authenticated by using the shared key of the communication apparatus (10) exists around the communication apparatus (10) "number of authenticated devices=0" meets [condition 1] shown in FIG. 4. In this case, the function controlling unit (140) restricts the functions (12, 13) except the voice communication function (11).

Therefore, even when others except the owner pick up the communication apparatus (10), the others can not use the phonebook function (12), the user interface function (13) and the like. As a result, it is possible to prevent from accessing the personal information, the phonebook information, the schedule information and the like stored in the communication apparatus (10).

Further, a case where even when external devices (900-1 to n) which can be authenticated exist around the communication apparatus (10), external devices (900-1 to n) which can not be authenticated exist beyond the number of the external devices (900-1 to n) which can be authenticated "(number of authenticated devices≠0)<(number of unauthenticated devices)" meets [condition 4] shown in FIG. 4. In this case, the function controlling unit (140) restricts the functions (12, 13) except the voice communication function (11).

Therefore, when the communication apparatus (10) is placed in an environment different from an environment managed by the original owner, the function controlling unit (140) restricts the functions (12, 13) except the voice communication function (11). Therefore, even when the communication apparatus (10) and the external devices (900-1 to n) which can be authenticated are left together or stolen, others except the owner can not use the phonebook function (12), the user interface function (13) and the like. Therefore, it is possible to prevent from accessing the personal information, the phonebook information, the schedule information and the like stored in the communication apparatus (10).

Furthermore, a case where even when external devices (900-1 to n) which can not be authenticated exist around the communication apparatus (10), the number of the external devices (900-1 to n) which can not be authenticated is smaller than or equal to the number of external devices (900-1 to n) which can be authenticated "(number of authenticated devices) ≥(number of unauthenticated devices≠0)"

meets [condition 3] shown in FIG. 4. In this case, the function controlling unit (140) restricts only the phonebook function (12), and makes functions (11, 13) except the phonebook function (12) effective.

Thus, the communication apparatus (10) according to this mode retains in the control condition retaining unit (150) control matters depending on the number of the authenticated devices and the number of the unauthenticated devices. Then, the function controlling unit (140) refers to the control condition retaining unit (150) to specify control matter depending on the number of the authenticated devices and the number of the unauthenticated devices, and controls the various functions (11 to 13) based on the specified control matter. Therefore, the communication apparatus (10) according to this mode can control the various functions (11 to 13) depending on environmental situation of the communication apparatus (10) itself.

(Second Embodiment)

Next, a second embodiment is explained.

As shown in FIG. 5, a control device (200) according to the second embodiment counts reception signals received from the external devices (900-1 to n), and stops communication with the external devices (900-1 to n) depending on the number of the counted reception signals.

Therefore, when many external devices (900-1 to n) exist outside the control device (200), it is possible to avoid communication with unintended external device (900-1 to n), and to improve the security. Hereinafter, a control system according to this embodiment will be explained in detail with reference to FIG. 5.

<Configuration of Control System>

Firstly, a configuration of the control system according to this embodiment is explained with reference to FIG. 5.

The control system according to this embodiment includes the control device (200) and the external device (900-1 to n: n is an arbitrary integer).

<Internal Configuration of Control Device 200>

Next, an internal configuration of the control device (200) according to this embodiment is explained with reference to FIG. 5.

The control device (200) according to this embodiment includes a communication unit (210), a counting unit (220) and a communication controlling unit (230).

The communication unit (210) receives signals transmitted from the external devices (900-1 to n), and communicates with the external devices (900-1 to n).

The counting unit (220) counts the number of the reception signals received by the communication unit (210).

The communication controlling unit (230) controls the communication. Note that the communication controlling unit (230) stops the communication with the external devices (900-1 to n) depending on the number of the reception signals counted by the counting unit (220).

For example, when the number of the reception signals counted by the counting unit (220) exceeds a certain number, the communication controlling unit (230) stops the communication with the external devices (900-1 to n).

Further, when the number of the reception signals counted by the counting unit (220) exceeds a certain number within a predetermined time, the communication controlling unit (230) stops responses to the reception signals received from the external devices (900-1 to n).

<Processing Operation in Control Device 200>

Next, a processing operation in the control device (200) according to this embodiment is explained with reference to FIG. 5.

Firstly, the communication unit (210) receives signals from the external devices (900-1 to n), and then notifies the counting unit (220) of the reception signals.

The counting unit (220) counts the reception signals notified from the communication unit (210), and notifies the communication controlling unit (230) of stopping the communication with the external devices (900-1 to n), depending on the number of the reception signals counted.

For example, when the number of the reception signals exceeds the certain number, the counting unit (220) notifies the communication controlling unit (230) of stopping the communication.

The communication controlling unit (230) accepts the notification of stopping the communication from the counting unit (220), and then controls the communication unit (210) to stop the communication with the external devices (900-1 to n).

Thus, the control device (200) according to this embodiment counts the reception signals received from the external devices (900-1 to n), and stops the communication with the external devices (900-1 to n) depending on the number of the reception signals counted.

Therefore, when many external devices (900-1 to n) exist outside the control device (200), the control device (200) according to this embodiment can avoid communication with unintended external device (900-1 to n) and improve the security.

Further, by avoiding unintended communication with the external devices (900-1 to n), unnecessary communication is restrained. Therefore, it is possible to realize reduction of power consumption in the control device (200).

Note that in the above-described control device (200) according to this embodiment, the counting unit (220) notifies the communication controlling unit (230) of stopping the communication when the number of the reception signals exceeds the certain number. Then, the communication controlling unit (230) controls the communication unit (210) to stop the communication with the external devices (900-1 to n), when the notification of stopping the communication is accepted from the counting unit (220).

However, the control device (200) according to this embodiment can also be constructed as follows. Firstly, the counting unit (220) notifies the communication controlling unit (230) of stopping responses to the reception signals received from the external devices (900-1 to n), when the number of the reception signals exceeds a certain number within a set time preliminarily set. Then, the communication controlling unit (230) controls the communication unit (210) to stop responses to the reception signals received from the external devices (900-1 to n), when the notification of stopping the responses is accepted from the counting unit (220).

<Internal Configuration of Counting Unit 220>

Next, an internal configuration of the counting unit (220) according to this embodiment is explained with reference to FIG. 6.

The counting unit (220) according to this embodiment includes a timer (221), a counter (222), a reference value retaining unit (223) and a determination unit (224).

The counter (222) counts the reception signals notified from the communication unit (210), periodically refers to the timer (221), and notifies the determination unit (224) of the number of the reception signals counted when a predetermined time has been elapsed.

The reference value retaining unit (223) retains an execution reference value for executing the stop control of the communication. The determination unit (224) compares the number of the reception signals notified from the counter (222) with the execution reference value retained in the reference value retaining unit (223). Then, the determination unit (224) notifies the communication controlling unit (230) of stopping the communication, when the number of the reception signals notified from the counter (222) is equal to or more than the execution reference value. The execution reference value retained in the reference value retaining unit (223) is the one equivalent to frequency of the communication.

The communication controlling unit (230) stops the communication unit (210) to stop the communication with the external devices (900-1 to n), when the notification of stopping the communication is accepted from the determination unit (224).

Thus, the counting unit (220) according to this embodiment can perform control so as to stop the communication with the external device (900-1 to n), when the number of the reception signals exceeds the certain number within the predetermined time.

Note that the counting unit (220) according to this embodiment can also perform control so as to stop the responses to the reception signals received from the external device (900-1 to n), when the number of the reception signals exceeds the certain number within the predetermined time.

(Third Embodiment)

Next, a third embodiment is explained.

The control device (200) according to this embodiment stops the communication with the external devices (900-1 to n), when the number of reception signals received from external devices (900-1 to n) exceeds a certain number.

Therefore, when many external devices (900-1 to n) exist outside the control device (200), it is possible to avoid communication with unintended external device (900-1 to n), and improve the security. Hereinafter, a control system according to this embodiment will be explained in detail with reference to FIG. 7.

<Configuration of Control System>

The control system according to this embodiment is configured similarly to that in the second embodiment shown in FIG. 5.

<Internal Configuration of Counting Unit 220>

Next, an internal configuration of the counting unit (220) according to this embodiment is explained with reference to FIG. 7.

The counting unit (220) according to this embodiment includes an identification unit (225), an identification information retaining unit (226), the timer (221), the counter (222), the reference value retaining unit (223) and the determination unit (224).

When identification information is included in the reception signal notified from the communication unit (210), the identification unit (225) extracts the identification information to be notified to the identification information retaining unit (226). The identification information is the one for specifying the external device (900-1 to n).

The identification information retaining unit (226) refers to the timer (221) to acquire time information when the identification information is accepted from the identification unit (225), and retains the identification information together with the time information.

Further, the identification information retaining unit (226) periodically refers to the timer (221) to acquire time information. Then, the identification information retaining unit (226) compares the time information acquired from the tinier (221) with the time information retained together with the identification information in the identification information retaining unit (226) itself, and deletes identification information to which a set time preliminarily set has been elapsed from the identification information retaining unit (226) itself.

The counter (222) periodically refers to the identification information retaining unit (226) to count the number of the identification information retained in the identification information retaining unit (226), and notifies the determination unit (224) of the number.

The reference value retaining unit (223) retains an execution reference value for executing the stop control of the communication. The determination unit (224) compares the number of the identification information notified from the counter (222) with the execution reference value retained in the reference value retaining unit (223), and notifies the communication controlling unit (230) of stopping the communication, when the number of the identification information notified from the counter (222) is equal to or more than the execution reference value.

The communication controlling unit (230) stops the communication unit (210) to stop the communication with the external devices (900-1 to n), when the notification of stopping the communication is accepted from the determination unit (224).

Thus, the control device (200) according to this embodiment counts the number of the external devices (900-1 to n) based on the identification information included in the reception signal received from each of the external devices (900-1 to n), and stops the communication with the external devices (900-1 to n) depending on the number of the external devices (900-1 to n).

For example, the control device (200) stops the communication with the external devices (900-1 to n), when the number of the external devices (900-1 to n) exceeds a certain number.

Further, the control device (200) stops responses to the reception signals, when the number of the external devices (900-1 to n) exceeds a certain number within a predetermined time.

Therefore, when many external devices (900-1 to n) exist outside the control device (200), it is possible to avoid communication with unintended external device (900-1 to n), and improve the security.

Further, by avoiding unintended communication with the external devices (900-1 to n), unnecessary communication is restrained. Therefore, it is possible to realize reduction of power consumption in the control device (200).

<First Mode for the Invention>

Next, a case where the above-described control device (200) is mounted on an IC card is explained as an example.

When the above-described control device (200) is mounted on the IC card, the communication unit (210) is equivalent to an antenna, and a modulation/demodulation circuit in the IC card. The external device (900-1 to n) is equivalent to a reader/writer device.

The communication unit (210) according to this mode receives request signals such as read from the reader/writer device and write thereto, and then notifies the counting unit (220) of the request signals.

Assume that the IC card according to this mode communicates with only one reader/writer device at the same time. Therefore, the reference value retaining unit (223) retains "2" as the execution reference value for executing the stop control of the communication, and performs control so as to stop the communication when the number of reader/writer devices which are destinations of the communication is equal to or more than two.

Note that when the IC card is used for one reader/writer device, the identification information retaining unit (226) retains identification information only for one. Therefore, the counter (222) notifies the determination unit (224) of "1".

The determination unit (224) compares the number "1" of the identification information notified from the counter (222) with the execution reference value "2" retained in the reference value retaining unit (223). Since the number "1" of the identification information notified from the counter (222) is not equal to or more than the execution reference value "2", the determination unit (224) does not notify the communication controlling unit (230) of stopping the communication.

However, when the second reader/writer device is placed near the above-mentioned first reader/writer device and a request signal from the second reader/writer device is received by the communication unit (210), the identification information retaining unit (226) retains identification information for two. Therefore, the counter (222) notifies the determination unit (224) of "2".

The determination unit (224) compares the number "2" of the identification information notified from the counter (222) with the execution reference value "2" retained in the reference value retaining unit (223). Since the number "2" of the identification information notified from the counter (222) is equal to or more than the execution reference value "2", the determination unit (224) notifies the communication controlling unit (230) of stopping the communication. Therefore, the communication controlling unit (230) stops the communication unit (210) to stop the communication.

Therefore, the control device (200) can prevent the IC card from performing unintended control due to the unnecessary second reader/writer device.

<Second Mode for the Invention>

Next, a case where the above-described control device (200) is mounted on a reader/writer device for an IC card is explained as an example.

When the above-described control device (200) is mounted on the reader/writer device, the communication unit (210) is equivalent to an antenna, and a modulation/demodulation circuit in the reader/writer device. The external device (900-1 to n) is equivalent to the IC card.

A basic operation in this mode is similar to that in the first mode. However, in this mode, when identification information of two or more IC cards is received, the reader/writer device stops communication, thereby enabling to prevent from acquiring data from another unintended IC card and writing data thereto.

<Third Mode for the Invention>

Next, a case where the above-described control device (200) is mounted on an IC chip or a reader/writer device in a radio apparatus, whose size is small and movement is easy such as a mobile phone, is explained as an example.

A basic operation in this mode is similar to those in the first mode and the second mode. However, the value retained in the reference value retaining unit (223) can be arbitrarily set and changed.

For example, when data is exchanged between a plurality of acquaintances (e.g. three people) at the same time, the value retained in the reference value retaining unit (223) is set with "3". Otherwise, the value retained in the reference value retaining unit (223) is set with "2" so as to communicate with only one destination.

Therefore, it is possible not only to exchange data between a plurality of acquaintances, but also to prevent from performing unintended communication in a situation where external devices of others which can wirelessly communicate with two or more devices exist within a range of communication such as on a crowded train.

Note that the above-described embodiments are preferred embodiments of the present invention. The scope of the present invention is not limited to the above-described embodiments. It is possible for those skilled in the art to perform modifications or substitutions of the above-described embodiments without departing from the scope of the present invention, thereby constructing modes where various changes are made.

For example, the authentication method in the above-mentioned modes is not limited to the method for using the shared key. Depending on the intended use, various authentication methods can be applied.

Further, control matters for controlling various functions are not limited to the voice communication function (11), the phonebook function (12) and the user interface function (13) described in the above-mentioned mode of FIG. 3, but can be constructed so as to control every function.

For example, generation of sounds and display of messages for warning, call to particular phone number, display of contact information and the like may be included. Further, transmission of mail to particular destination, access of particular Web page, notification of device status to particular server and the like may also be included.

Further, it is possible for the owner of the communication apparatus to arbitrarily set various functions controlled depending on the number of authenticated devices and the number of unauthenticated devices, thereby constructing control matters depending on the owner.

Further, the control system according to this embodiment can be applied to every connection topology regardless of wireless or wired connection. For example, the control system can be applied to long-range wireless communication where communication range of the control device is broader than several hundred meters, proximity wireless communication where the communication range is less than or equal to several meters, and wired communication where the communication rage is limited. Note that the control system according to this embodiment is particularly effective for short-range wireless communication where the communication range of the control device is within several ten meters to several hundred meters.

Furthermore, the control operation in each device forming the control system according to the above-mentioned embodiments can be implemented by hardware, software, or combination thereof.

Note that if the process is to be implemented by software, it is possible to install a program having a processing sequence recorded thereon in a memory within a computer embedded in dedicated hardware and execute it, or install the program in a general-purpose computer capable of executing various processes and execute it.

For example, the program can be recorded in advance in a hard disk drive or a ROM (Read Only Memory) used as a recording medium. Alternatively, the program can also be temporarily or permanently stored (recorded) in a removable recording medium. It is possible to provide such a removable recording medium as the so-called "packaged software". Note that the removable recording medium may include a floppy (registered trademark) disk, a CD-ROM (Compact Disc Read Only Memory), a MO (Magneto optical) disk, a DVD (Digital Versatile Disc), a magnetic disk, and a semiconductor memory.

Note that the program is installed from the removable recording medium as described above into the computer. Further, the program is wirelessly transferred from a download site to the computer. Furthermore, the program is transferred to the computer in a wired manner through a network.

Further, in addition to executing the operations in a time series in accordance with processing operations described in the above-mentioned embodiments, it is also possible to construct so that they are executed in parallel or in an individual manner depending on the processing capacity of an apparatus that executes the process or depending on the necessity.

Furthermore, the control system described in the above-mentioned embodiments can be constructed as a logical set configuration of a plurality of devices, or as a configuration where devices exist within the same package.

This application is the National Phase of PCT/JP2008/ 062867, filed Jul. 16, 2008, which is based upon and claims the benefit of priority from Japanese patent application No. 2007-189338, filed on Jul. 20, 2007, the disclosure of which is incorporated herein in its entirety by reference.

INDUSTRIAL APPLICABILITY

The present invention can be applied to a service in which various functions are controlled depending on the number of external devices existing outside a device.

BRIEF DESCRIPTION OF DRAWINGS

FIG. 4 is a diagram illustrating an example of control matters retained in a control condition retaining unit (150) of a control device (100) shown in FIG. 3;

EXPLANATION OF REFERENCE

Figure 1:
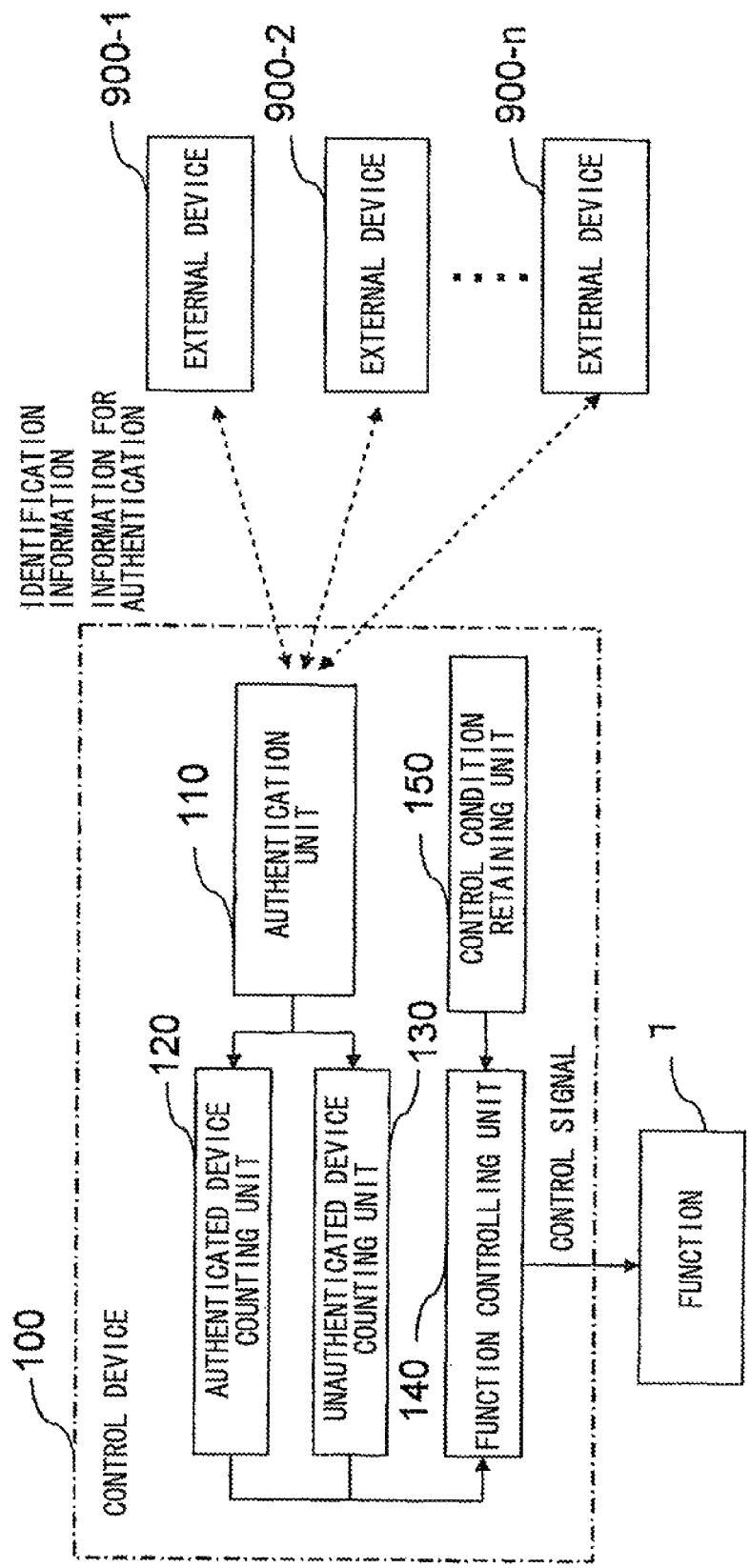
FIG. 1 is a diagram illustrating a configuration example of a control system according to a first embodiment.
Figure 2:
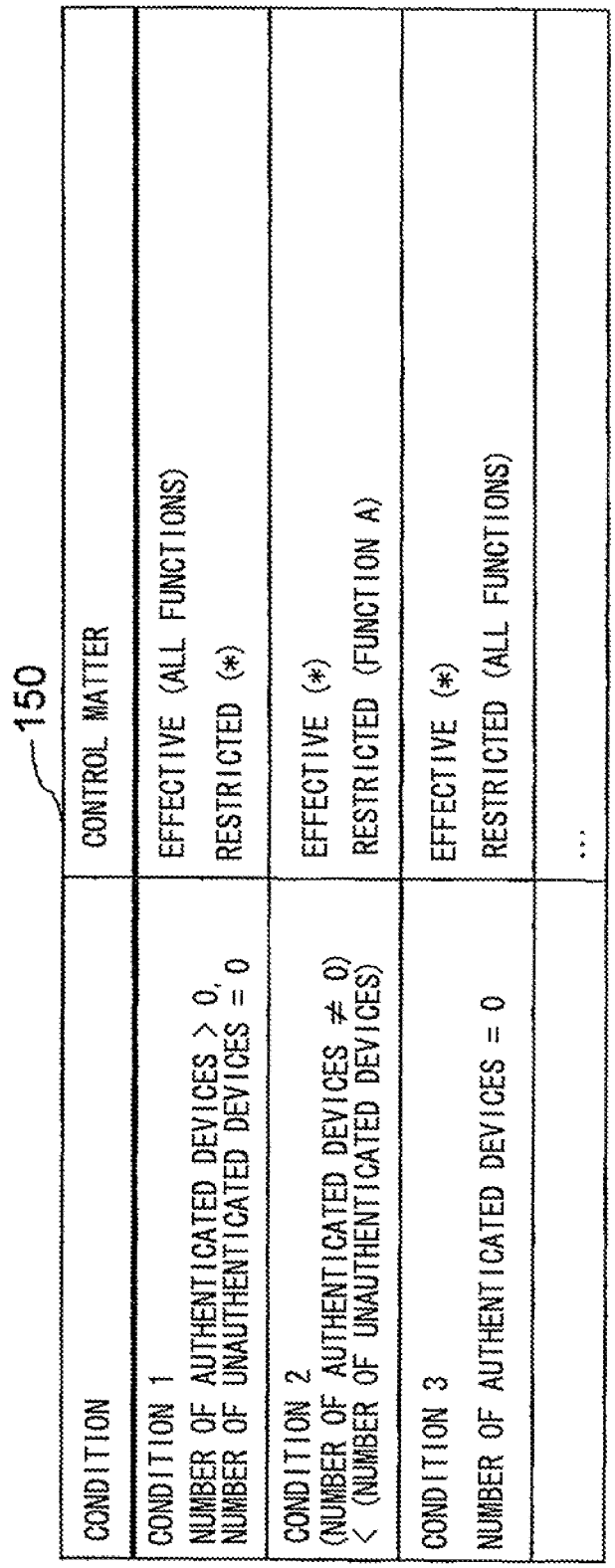
FIG. 2 is a diagram illustrating an example of control matters retained in a control condition retaining unit (150) of a control device (100) shown in FIG. 1.
Figure 3:
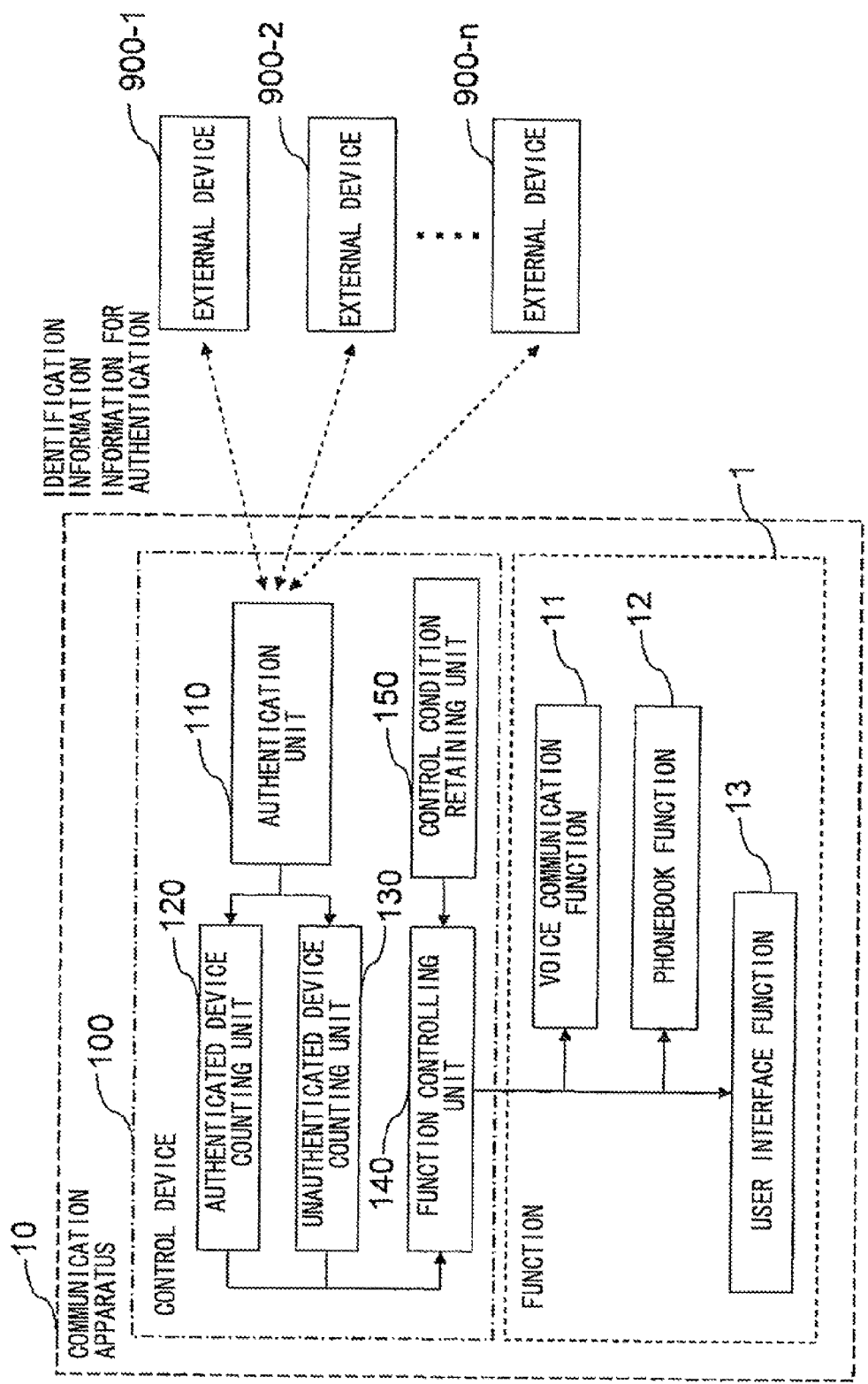
FIG. 3 is diagram illustrating a configuration example of a communication apparatus (10) mounted with a control device (100) according to a first embodiment.
Figure 5:
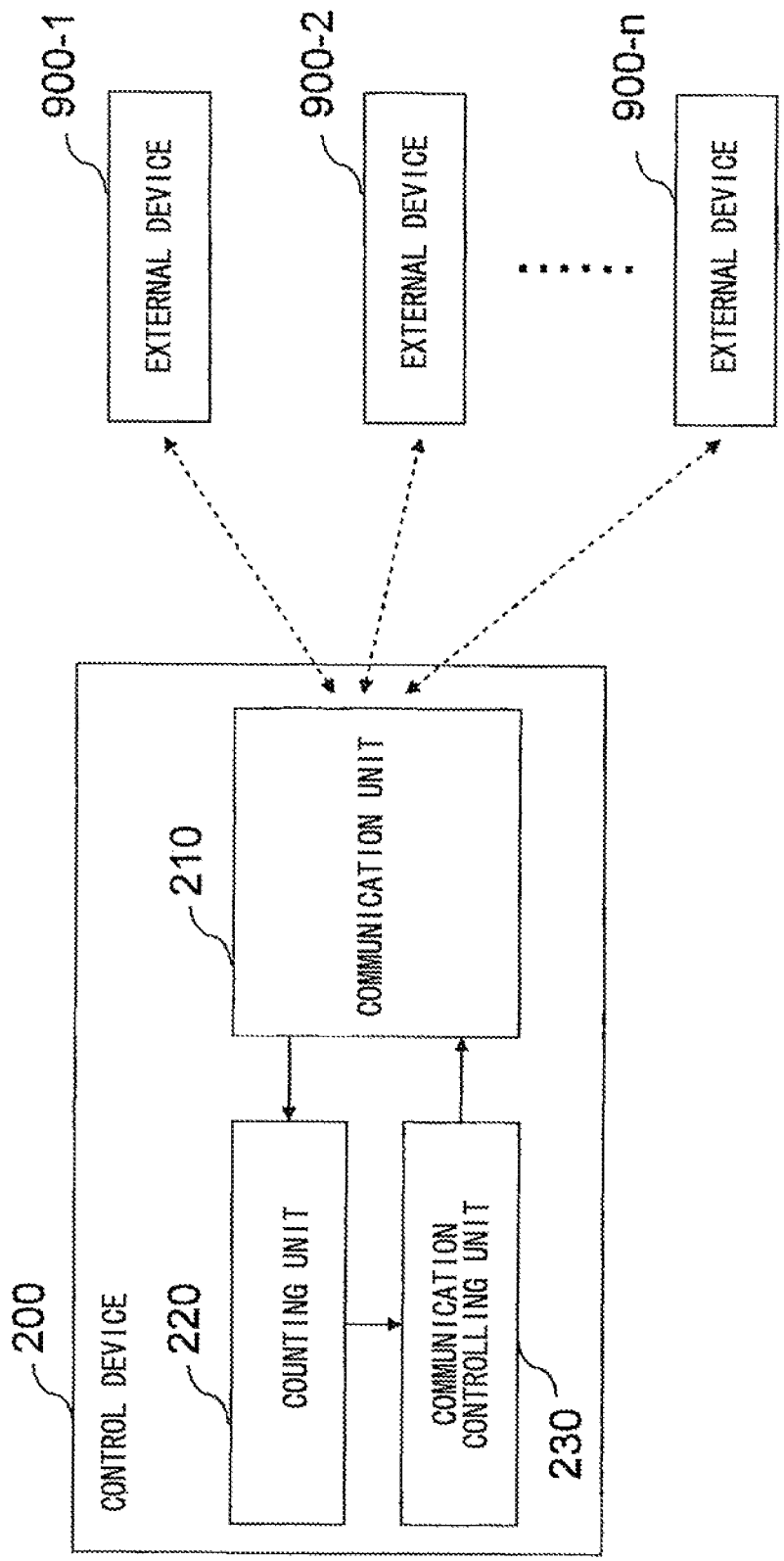
FIG. 5 is a diagram illustrating a configuration example of a control system according to a second embodiment.
Figure 6:
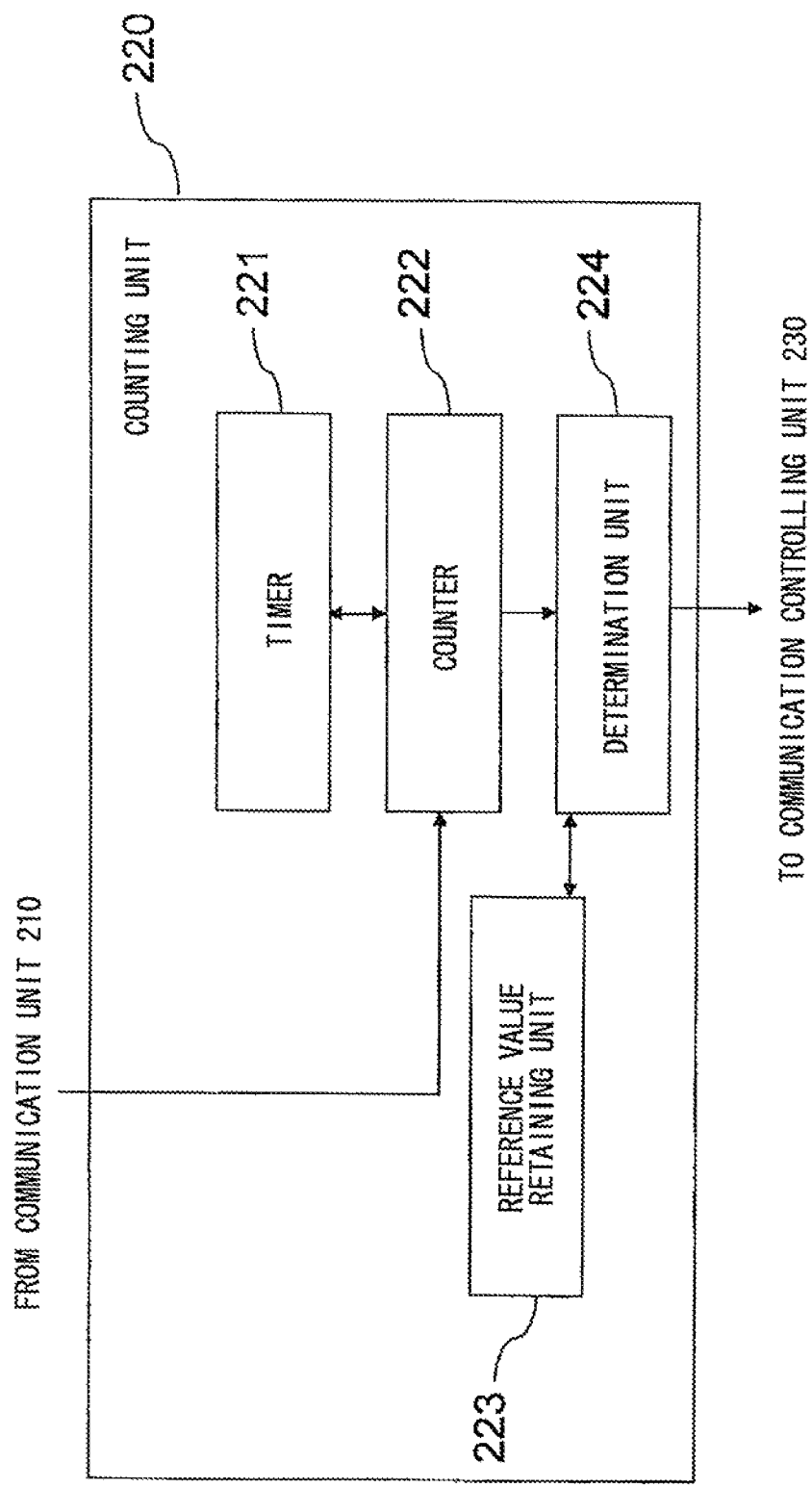
FIG. 6 is a diagram illustrating an internal configuration example of a counting unit (220) of a control device (200) forming a control system according to a second embodiment.
Figure 7:
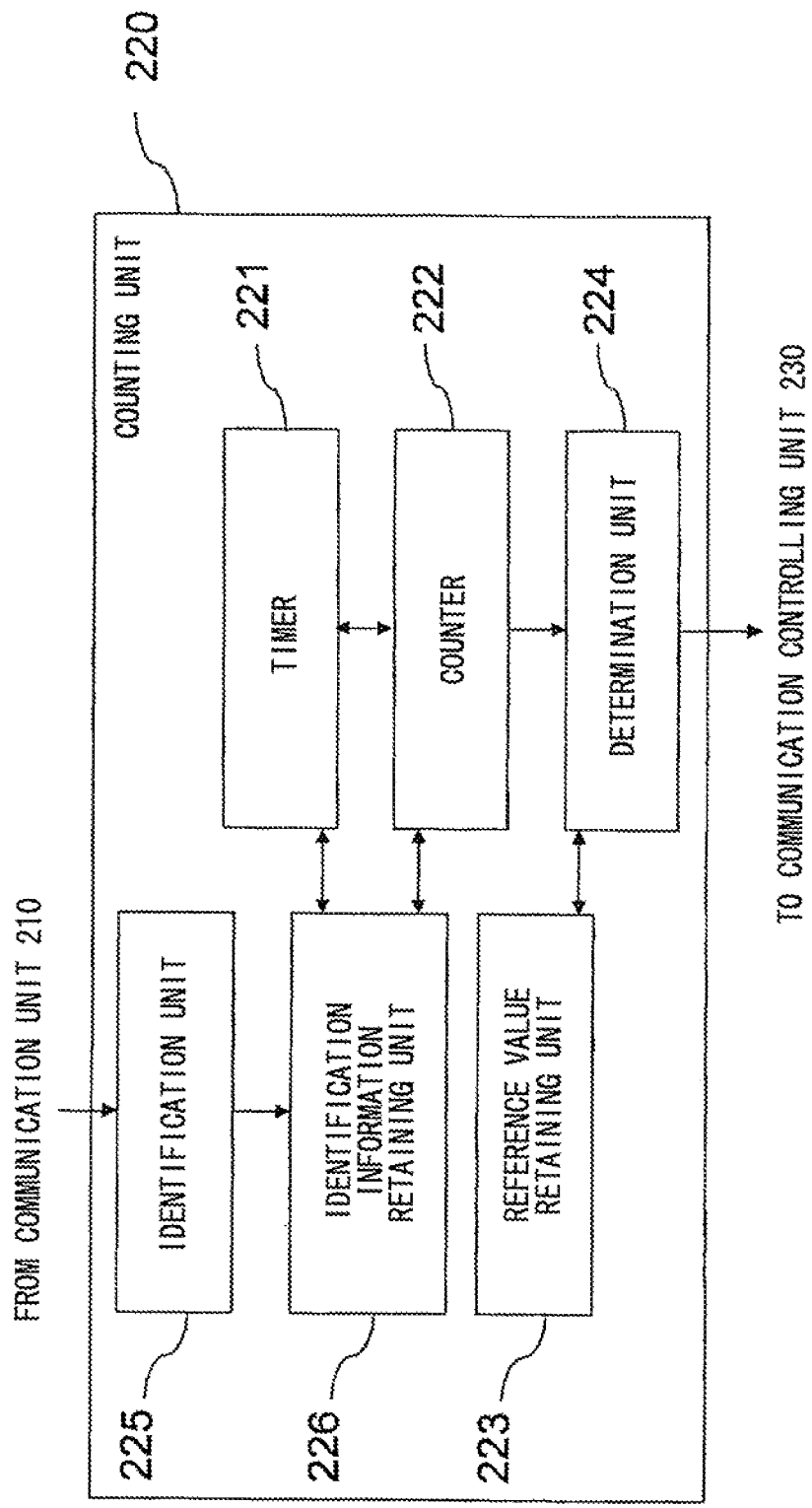
FIG. 7 is a diagram illustrating an internal configuration example of a counting unit (220) of a control device (200) forming a control system according to a third embodiment.

100 CONTROL DEVICE
110 AUTHENTICATION UNIT
120 AUTHENTICATED DEVICE COUNTING UNIT
130 UNAUTHENTICATED DEVICE COUNTING UNIT
140 FUNCTION CONTROLLING UNIT
150 CONTROL CONDITION RETAINING UNIT
900-1 to 900-n EXTERNAL DEVICE
1 FUNCTION
11 VOICE COMMUNICATION FUNCTION
12 PHONEBOOK FUNCTION
13 USER INTERFACE FUNCTION
200 CONTROL DEVICE
210 COMMUNICATION UNIT
220 COUNTING UNIT
221 TIMER
222 COUNTER
223 REFERENCE VALUE RETAINING UNIT
224 DETERMINATION UNIT
225 IDENTIFICATION UNIT
226 IDENTIFICATION INFORMATION RETAINING UNIT
230 COMMUNICATION CONTROLLING UNIT

The invention claimed is:

1. A control device that controls a plurality of functions and is in communication with a plurality of external devices, the control device comprising a hardware processor configured to:
   authenticate the external devices;
   count the number of the authenticated devices and the number of unauthenticated devices;
   restrict a first one of the functions if a first function restricting condition is satisfied, the first condition being determined by a number of the authenticated devices being greater than a number of the unauthenticated devices and the number of the unauthenticated devices being non-zero, and
   restrict a second one of the functions if a second function restricting condition is satisfied, the second condition being determined by a number of the authenticated devices being less than a number of the unauthenticated devices and the number of the authenticated devices being non-zero.

2. The control device according to claim 1, further comprising a memory configured to retain control matters depending on the number of the authenticated devices and the number of the unauthenticated devices,
   wherein the hardware processor refers to the memory to specify control matter depending on the number of the authenticated devices and the number of the unauthenticated devices, and controls the restricted function based on the specified control matter.

3. The control device according to claim 2, wherein the hardware processor
   counts and retains the number of the authenticated devices;
   counts and retains the number of the unauthenticated devices; and
   refers to the memory to specify control matter depending on the number of authenticated devices retained and the number of unauthenticated devices retained, and controls the restricted function based on the specified control matter.

4. The control device according to claim 2, wherein the memory retains the function restricting conditions made up of the number of the authenticated devices and the number of the unauthenticated devices in association with control matters for controlling the restricted functions, and
   the hardware processor refers to the memory to specify control matter that meets a function restricting condition depending on the number of the authenticated devices and the number of the unauthenticated devices, and controls the restricted function based on the specified control matter.

5. The control device according to claim 1, wherein the functions include a voice communication function that performs voice communication with connecting to a subscriber network, and the hardware processor controls the voice communication function to stop the voice communication if the number of the unauthenticated devices exceeds a specific number, even when an authenticated device exists.

6. The control device according to claim 1, wherein the functions include a data communication function that performs data communication with connecting to a subscriber network, and
the hardware processor controls the data communication function to stop the data communication, when the number of the unauthenticated devices is larger than the number of the authenticated devices.

7. The control device according to claim 1, wherein the functions include a radio communication function that performs radio communication, and
the hardware processor controls the radio communication function to stop the radio communication, when the number of the unauthenticated devices is larger than the number of the authenticated devices.

8. The control device according to claim 1, wherein the functions include an access function for various information recorded in a recording medium, and
the hardware processor controls the access function to be inhibited from accessing the various information, when the number of the unauthenticated devices is larger than the number of the authenticated devices.

9. The control device according to claim 1, wherein the functions include an erasure function that erases various information recorded in a recording medium, and
the hardware processor controls the erasure function to erase the various information, when the number of the unauthenticated devices is larger than the number of the authenticated devices.

10. The control device according to claim 1, wherein the functions include an encryption function that encrypts various information recorded in a recording medium, and
the hardware processor controls the encryption function to encrypt the various information, when the number of the unauthenticated devices is larger than the number of the authenticated devices.

11. The control device according to claim 8, wherein the various information includes at least one of personal information, phonebook information, and schedule information.

12. A system comprising:
communication apparatus having functions; and
a control device to control the functions of the communication apparatus, the control device comprising a hardware processor configured to:
authenticate external devices communicating with the communication apparatus;
count the number of the authenticated devices and the number of unauthenticated devices;
restrict a first one of the functions if a first function restricting condition is satisfied, the first condition being determined by a number of the authenticated devices being greater than a number of the unauthenticated devices and the number of the unauthenticated devices being non-zero, and
restrict a second one of the functions if a second function restricting condition is satisfied, the second condition being determined by a number of the authenticated devices being less than a number of the unauthenticated devices and the number of the authenticated devices being non-zero.

13. A control system comprising:
a control device that controls a plurality of functions; and
a plurality of external devices that are in communication with the control device,
wherein the control device includes a hardware processor configured to:
authenticate the external devices,
count the number of the authenticated devices and the number of unauthenticated devices;
restrict a first one of the functions if a first function restricting condition is satisfied, the first condition being determined by a number of the authenticated devices being greater than a number of the unauthenticated devices and the number of the unauthenticated devices being non-zero, and
restrict a second one of the functions if a second function restricting condition is satisfied, the second condition being determined by a number of the authenticated devices being less than a number of the unauthenticated devices and the number of the authenticated devices being non-zero.

14. A control method performed in a control device that controls a plurality of functions and is in communication with a plurality of external devices, comprising;
authenticating the external devices;
counting the number of the authenticated devices and the number of unauthenticated devices;
restricting a first one of the functions if a first function restricting condition is satisfied, the first condition being determined by a number of the authenticated devices and being greater than a number of the unauthenticated devices and the number of the unauthenticated devices being non-zero, and
restrict a second one of the functions if a second function restricting condition is satisfied, the second condition being determined by a number of the authenticated devices being less than a number of the unauthenticated devices and the number of the authenticated devices being non-zero.

15. A non-transitory computer readable medium that stores a control program for causing a control device which controls a plurality of functions and is in communication with a plurality of external devices to execute:
authenticating the external devices;
counting the number of the authenticated devices and the number of unauthenticated devices;
restricting a first one of the functions if a first function restricting condition is satisfied, the first condition being determined by a number of the authenticated devices being greater than a number of the unauthenticated devices and the number of the unauthenticated devices being non-zero, and
restricting a second one of the functions if a second function restricting condition is satisfied, the second condition being determined by a number of the authenticated devices being less than a number of the unauthenticated devices and the number of the authenticated devices being non-zero.

* * * * *